(12) United States Patent
Baek et al.

(10) Patent No.: US 8,347,314 B2
(45) Date of Patent: Jan. 1, 2013

(54) METHOD FOR MANAGING JAVA APPLICATIONS

(75) Inventors: Wonjang Baek, Seongnam-si (KR); John Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 416 days.

(21) Appl. No.: 12/656,872

(22) Filed: Feb. 18, 2010

(65) Prior Publication Data
US 2010/0218189 A1   Aug. 26, 2010

(30) Foreign Application Priority Data
Feb. 20, 2009   (KR) .................. 10-2009-0014161

(51) Int. Cl.
*G06F 9/46*   (2006.01)

(52) U.S. Cl. ....................................... 719/313; 718/100
(58) Field of Classification Search .................. 719/310, 719/313; 718/100
See application file for complete search history.

(56) References Cited

U.S. PATENT DOCUMENTS

| | | | |
|---|---|---|---|
| 7,600,045 B2* | 10/2009 | Horii et al. | 709/246 |
| 8,015,548 B2* | 9/2011 | Chen et al. | 717/118 |
| 2006/0080474 A1* | 4/2006 | Horii et al. | 710/8 |
| 2007/0038989 A1* | 2/2007 | Newton et al. | 717/166 |

* cited by examiner

*Primary Examiner* — Van Nguyen
(74) *Attorney, Agent, or Firm* — Stein McEwen, LLP

(57) ABSTRACT

A method for managing JAVA applications executable in a user device provides an expandability for and a continuity between JAVA applications by changing states of the JAVA applications in execution and sharing information between the JAVA applications.

22 Claims, 9 Drawing Sheets

METHOD FOR MANAGING JAVA APPLICATIONS

CROSS-REFERENCE TO RELATED APPLICATIONS

This application claims the benefit of Korean Patent Application No. 10-2009-0014161 filed on Feb. 20, 2009, which is hereby incorporated for reference.

BACKGROUND OF THE INVENTION

1. Field of the Invention

The present invention relates to a method for managing JAVA applications executable in a user device.

2. Description of the Related Art

Conventional televisions or conventional DVD players are only capable of playing audio/video data. However, latest digital televisions and blu-ray players are capable of providing an environment for executing applications.

Latest mobile communication terminals are also capable of providing the environment.

The applications executable in user devices such as the digital televisions, blu-ray players and mobile communication terminal is usually created using JAVA language (hereinafter referred to as "JAVA application") and provided to the user device in a byte code format.

Operations such as a start and an end of the application and an access to system resources are carried out between the application and an operating system on which the application is executed.

An application model defines how the application should be managed and also defines roles of the operating system and the application.

JAVA Specifications such as J2ME (JAVA 2 Platform Micro Edition) and J2SE (JAVA 2 Platform Sun Edition) currently supports various application models. Applet and Xlet are examples of the application model.

Sun Microsystems provides Xlet for executing the JAVA application in an embedded device such as the digital television. While Applet is an embedded application which is executed in a browser, Xlet is an embedded application executed in the embedded device.

Generally, one JAVA application is executed and displayed on a single screen of the user device.

For instance, when another JAVA application is selected for execution while a startup JAVA application is executed and displayed, the startup JAVA application is then halted and the selected JAVA application is executed.

In other words, the JAVA applications executed in the user device are independent of each other. Therefore, it is difficult to guarantee a continuity between the JAVA applications because information between the independent JAVA applications cannot be shared.

SUMMARY OF THE INVENTION

It is an object of the present invention to provide a method for managing JAVA applications wherein an expandability for and a continuity between JAVA applications are provided by changing states of the JAVA applications in execution and sharing information between the JAVA applications.

In order to achieve above-described objects of the present invention, there is provided a method for managing JAVA applications executable in a user device, the method comprising steps of: (a) issuing a request for executing a second JAVA application, the request being issued by a first JAVA application and including a execution type information; (b) changing a state of the first JAVA application according to the execution type information; (c) executing the second JAVA application; and (d) killing the second JAVA application when a request for killing the second JAVA application is issued by the second JAVA application and re-changing the state of the first JAVA application changed in the step (b).

Preferably, the first JAVA application generates the request for executing the second JAVA application based on a user input received through a user interface.

Preferably, the request for executing the second JAVA application further includes a path for obtaining the second JAVA application.

Preferably, the step (c) comprises executing the second JAVA application by obtaining the second JAVA application at a location defined by the path.

Preferably, the execution type information designates one of: a first execution type wherein the first JAVA application is killed when the second JAVA application is executed and the first JAVA application is restarted when the second JAVA application is killed; a second execution type wherein the first JAVA application is paused when the second JAVA application is executed and the first JAVA application is unpaused when the second JAVA application is killed; and a third execution type wherein the first JAVA application is switched to background when the second JAVA application is executed and the first JAVA application is switched to foreground when the second JAVA application is killed.

Preferably, the step (b) comprises: killing the first JAVA application when the execution type information designates the first execution type; pausing the first JAVA application when the execution type information designates the second execution type; and switching the first JAVA application to background when the execution type information designates the third execution type.

Preferably, the step (d) comprises: restarting the first JAVA application when the execution type information designates the first execution type; unpausing the first JAVA application when the execution type information designates the second execution type; and switching the first JAVA application to foreground when the execution type information designates the third execution type.

Preferably, the first JAVA application and the second JAVA application inter-relays a shared information.

Preferably, the first JAVA application and the second JAVA application inter-relays a shared information when the execution type information designates one of the second execution type and the third execution type.

Preferably, each of the first JAVA application and the second JAVA application includes a JAVA application of Xlet format.

There is also provided a method for managing JAVA applications executable in a user device, the method comprising steps of: (a) issuing a request for executing a second JAVA application, the request being issued by a first JAVA application; (b) pausing the first JAVA application; (c) executing the second JAVA application; and (d) killing the second JAVA application when a request for killing the second JAVA application is issued by the second JAVA application and unpausing the first JAVA application paused in the step (b).

Preferably, the first JAVA application generates the request for executing the second JAVA application based on a user input received through a user interface.

Preferably, the request for executing the second JAVA application further includes a path for obtaining the second JAVA application.

Preferably, the step (c) comprises executing the second JAVA application by obtaining the second JAVA application at a location defined by the path.

Preferably, the first JAVA application and the second JAVA application inter-relays a shared information.

Preferably, each of the first JAVA application and the second JAVA application includes a JAVA application of Xlet format.

There is also provided a method for managing JAVA applications executable in a user device, the method comprising steps of: (a) issuing a request for executing a second JAVA application, the request being issued by a first JAVA application; (b) switching the first JAVA application to background; (c) executing the second JAVA application; and (d) killing the second JAVA application when a request for killing the second JAVA application is issued by the second JAVA application and switching the first JAVA application in background to foreground.

Preferably, the first JAVA application generates the request for executing the second JAVA application based on a user input received through a user interface.

Preferably, the request for executing the second JAVA application further includes a path for obtaining the second JAVA application.

Preferably, the step (c) comprises executing the second JAVA application by obtaining the second JAVA application at a location defined by the path.

Preferably, the first JAVA application and the second JAVA application inter-relays a shared information.

Preferably, each of the first JAVA application and the second JAVA application includes a JAVA application of Xlet format.

DETAILED DESCRIPTION OF THE INVENTION

A method for managing a JAVA application in accordance with the present invention will be described with reference to accompanied drawings.

Figure 1:
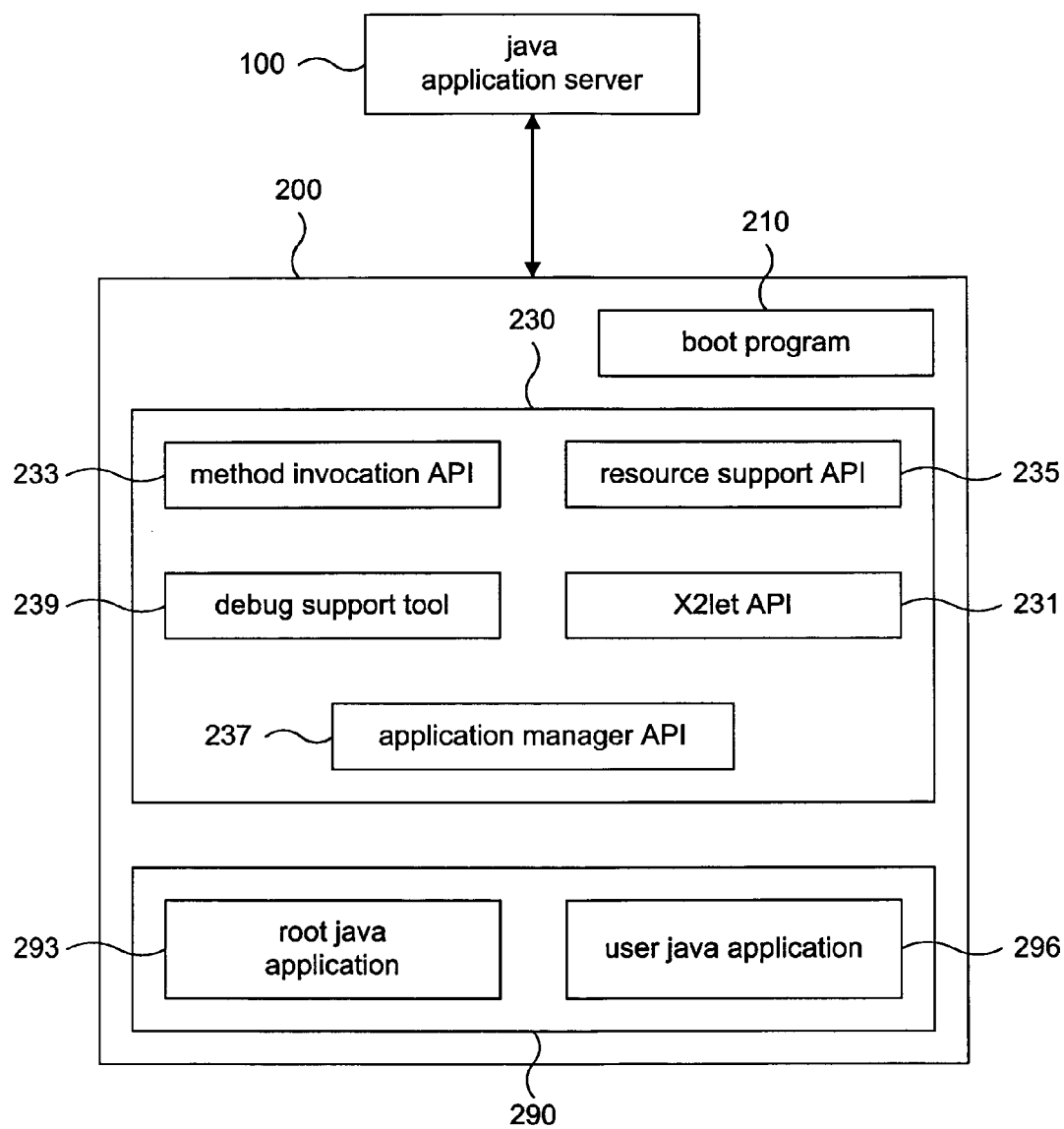
FIG. 1 is block diagram illustrating an environment for executing a method for managing a JAVA application in accordance with the present invention.

FIG. 1 is block diagram illustrating an environment for executing a method for managing a JAVA application in accordance with the present invention.

Referring to FIG. 1, the environment includes a JAVA application server 100 and a user device 200.

The JAVA application server 100 stores a JAVA application and transmits the JAVA application to the user device 200 when requested by the user device 200.

The user device 200 executes the JAVA application received from the JAVA application server 100 to be provided to a user. The user device 200 may include a digital television, a set-top box, a blu-ray player or a mobile communication terminal.

The JAVA application server 100 and the user device 200 are connected via a communication network such as the Internet and a wireless network.

Hereinafter, an application developer refers to a person who develops the JAVA application which may be executed in the JAVA application server 100 or the user device 200, the user refers to a person who uses the user device 200 and takes advantage of a service provided via the JAVA application developed by the application developer.

The user device 200 comprises a boot program 210, a run-time program 230 and a JAVA application 290.

The boot program 210 is stored within the user device 200 or in a storage medium accessible by the user device 200. The boot program 210 checks a status of the user device 200 and searches and obtains the suitable run-time program 230.

The run-time program 230 provides a run-time environment for the JAVA application 290.

The run-time program 236 includes an X2let API 231, a method invocation API 233, a resource support API 235, an application manager API 237 and a debug support tool 239.

The X2let API 231 developed by the Applicant is implemented by an enhanced Xlet in compliance with JAVA TV standard.

The X2let API 231 supports downloading of the JAVA application 290 from the JAVA application server 100 and execution of the downloaded JAVA application 290.

The method invocation API 233 developed by the Applicant executes a method in the JAVA application server 100 from the user device 200.

The resource support API 235 developed by the Applicant supports a memory-effective caching and a resource downloading. The resource support API 235 may handle resources such as an image, a byte array, a sound and a JAVA class.

The application manager API 237 developed by the Applicant manages a life cycle of the JAVA application 290. The JAVA application 290 may be started, paused, unpaused, switched to background or foreground and killed via the application manager API 237.

The debug support tool 239 237 developed by the Applicant supports debugging.

The JAVA application 290 may be classified into a root JAVA application 293 and a user JAVA application 296.

The root JAVA application 293 is a base application executed in the user device 200. The root JAVA application 293 is required to be executed in the user device 200. The root JAVA application 293 is executed at a startup of the user device 200 and displayed on a screen of the user device 200. The root JAVA application 293 may include a user interface for selecting the user JAVA application 296 to be executed. The user interface may be implemented as a graphical user interface. The user may select the user JAVA application 296 to be executed via the user interface.

The user JAVA application 296 is selected by the user and then executed. The user JAVA application 296 refers to the JAVA application other than the root JAVA application 293.

While the root JAVA application 293 is created by a manufacturer of the user device 200 and distributed with the user device 200, the user JAVA application 296 is created by the application developer and transmitted to the user device 200 through the JAVA application server 100.

The method in accordance with the present invention will be described in detail hereinafter.

Figure 2:
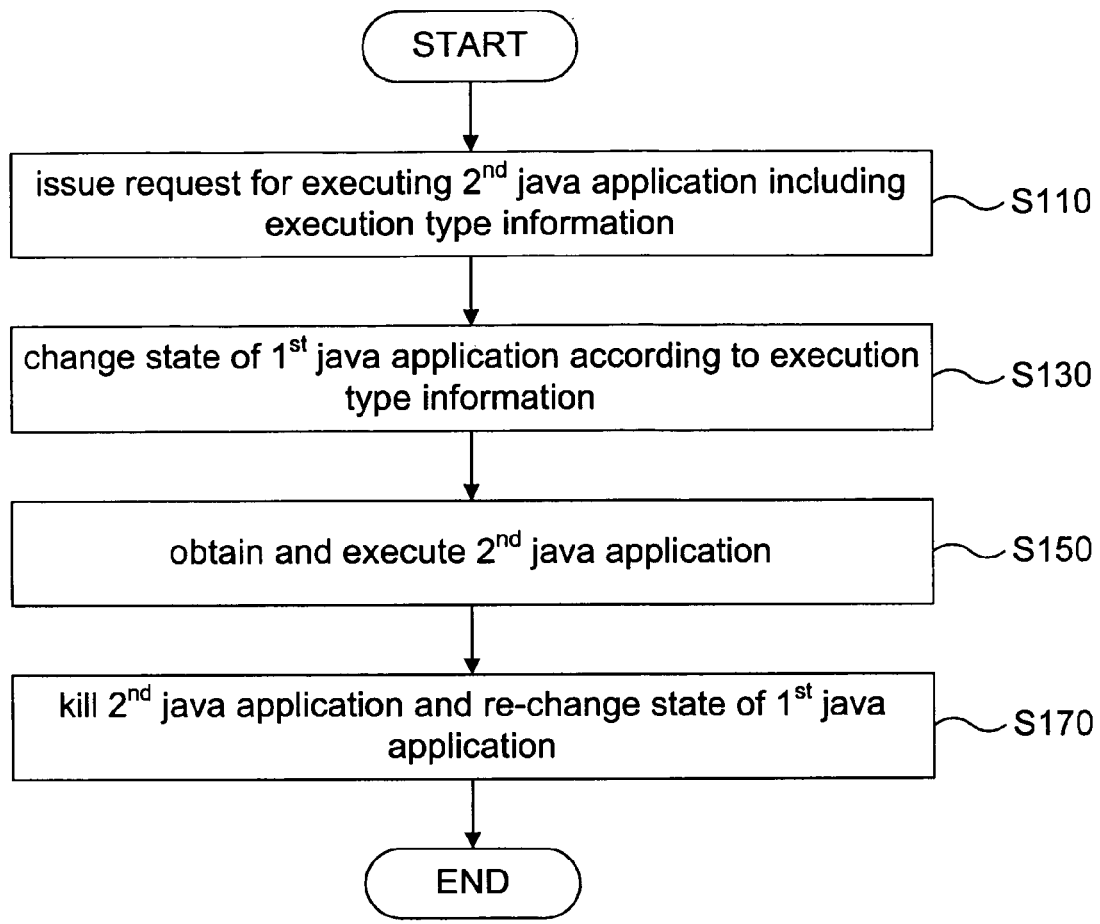
FIG. 2 is a flow diagram illustrating a first embodiment of a method for managing a JAVA application in accordance with the present invention.

FIG. 2 is a flow diagram illustrating a first embodiment of the method for managing the JAVA application in accordance with the present invention.

Referring to FIG. 2, a request for executing a second JAVA application generated by a first JAVA application is issued (S110).

The request includes an execution type information.

The first JAVA application may be the root JAVA application denoted as reference numeral 293 in FIG. 1 or the user JAVA application denoted as reference numeral 296 in FIG. 1. The second JAVA application may be the user JAVA application. It is preferable that each of the first JAVA application and the second JAVA application includes the JAVA application of Xlet format executable in the user device 200.

Figure 3:
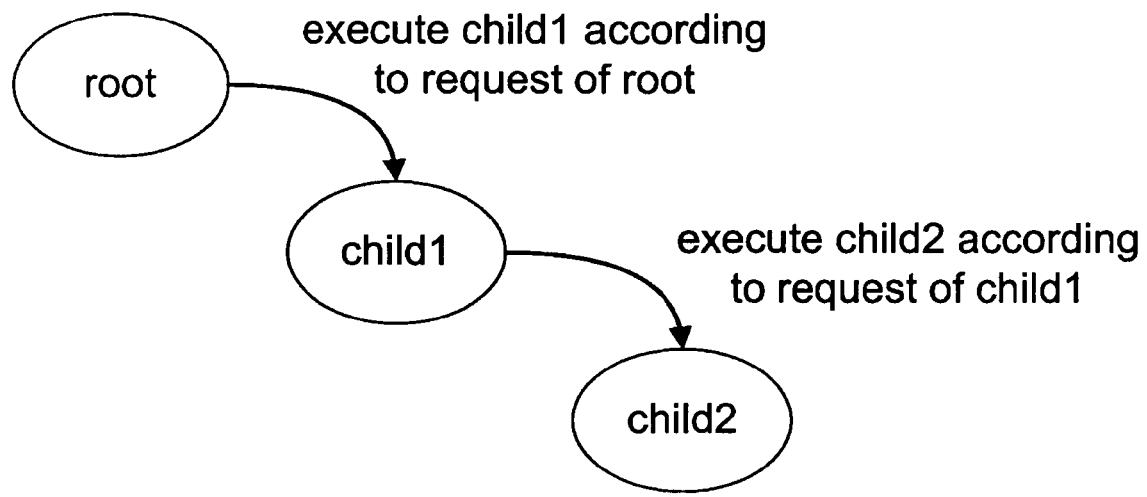
FIG. 3 is a diagram illustrating a relationship between a first JAVA application and a second JAVA application in accordance with the present invention.

FIG. 3 is a diagram illustrating a relationship between the first JAVA application and the second JAVA application in accordance with the present invention.

When the root JAVA application issues the request for executing a first child JAVA application, the root JAVA application and first child JAVA application correspond to the first JAVA application and the second JAVA application, respectively.

When first child JAVA application issues the request for executing a second child JAVA application, first child JAVA application and the second child JAVA application correspond to the first JAVA application and the second JAVA application, respectively.

The first JAVA application may include the user interface for receiving a user input.

The user interface may be the graphical user interface for executing the second JAVA application. When the user input is received while executing the first JAVA application, the first JAVA application generates and issues the request for executing the second JAVA application.

The request includes the execution type information which designates an execution type.

The execution type includes one of a first execution type, a second execution type and a third execution type.

In accordance with the first execution type, the first JAVA application is killed when the second JAVA application is executed and the first JAVA application is restarted when the second JAVA application is killed.

In accordance with the second execution type, the first JAVA application is paused when the second JAVA application is executed and the first JAVA application is unpaused when the second JAVA application is killed.

In accordance with the third execution type, the first JAVA application is switched to background when the second JAVA application is executed and the first JAVA application is switched back to foreground when the second JAVA application is killed In accordance with the present invention, a state of the first JAVA application is determined when the second JAVA application is executed.

When the execution type information does not designate certain the execution types, it may be regarded that the execution type information designates the first execution type.

That is, when the execution type information included in the request that does not designate the certain the execution type is issued, subsequent steps are carried out on an assumption that the execution type is the first execution type.

The request may also include a path for obtaining the second JAVA application.

When the second JAVA application is stored within the user device, the path may represent a location of the second JAVA application in the user device.

When the second JAVA application is stored in the JAVA application server, the path may represent a location of the second JAVA application in the JAVA application server.

The path may have a form of an URL (uniform resource locator).

Thereafter, the state of the first JAVA application is changed according to the execution type information included in the request issued in the step S110 (S130).

Figure 4:
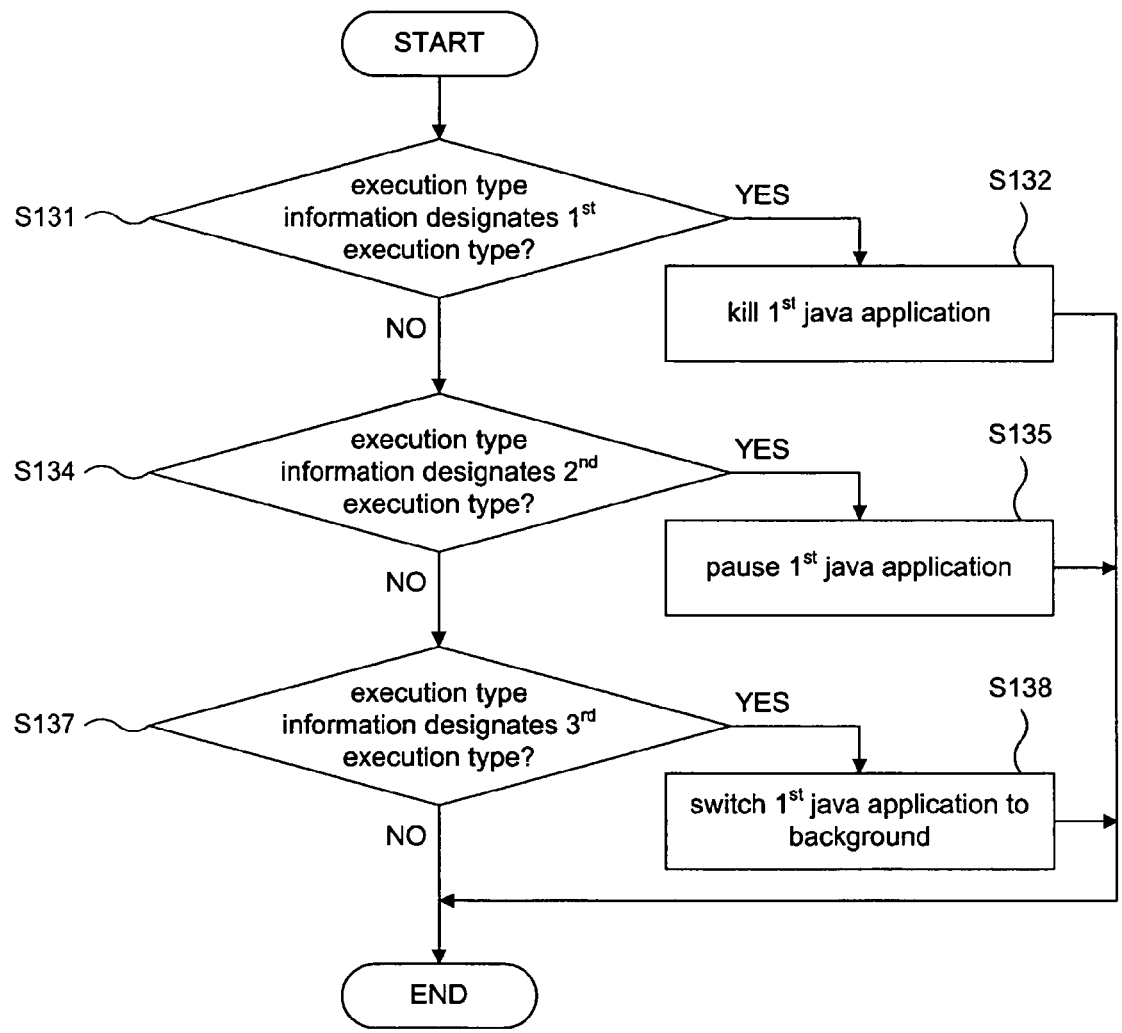
FIG. 4 is a flow diagram illustrating a change in a state of a first JAVA application based on an execution type information in accordance with the present invention.

FIG. 4 is a flow diagram illustrating the step S130 in detail wherein the state of the first JAVA application is changed based on the execution type information.

Referring to FIG. 4, when the execution type designated in the execution type information is the first execution type, the first JAVA application is killed (S131 and S132).

When the execution type designated in the execution type information is the second execution type, the first JAVA application is paused (S134 and S135).

When the execution type designated in the execution type information is the third execution type, the first JAVA application is switched to background (S137 and S138).

Referring back to FIG. 2, the second JAVA application is obtained and executed in parallel with or after carrying out the step S130 (S150).

Thereafter, When a request for killing the second JAVA application is issued while the second JAVA application is executed, the second JAVA application is killed and the first JAVA application state of which is changed in the step S130 is re-changed (S170).

Figure 5:
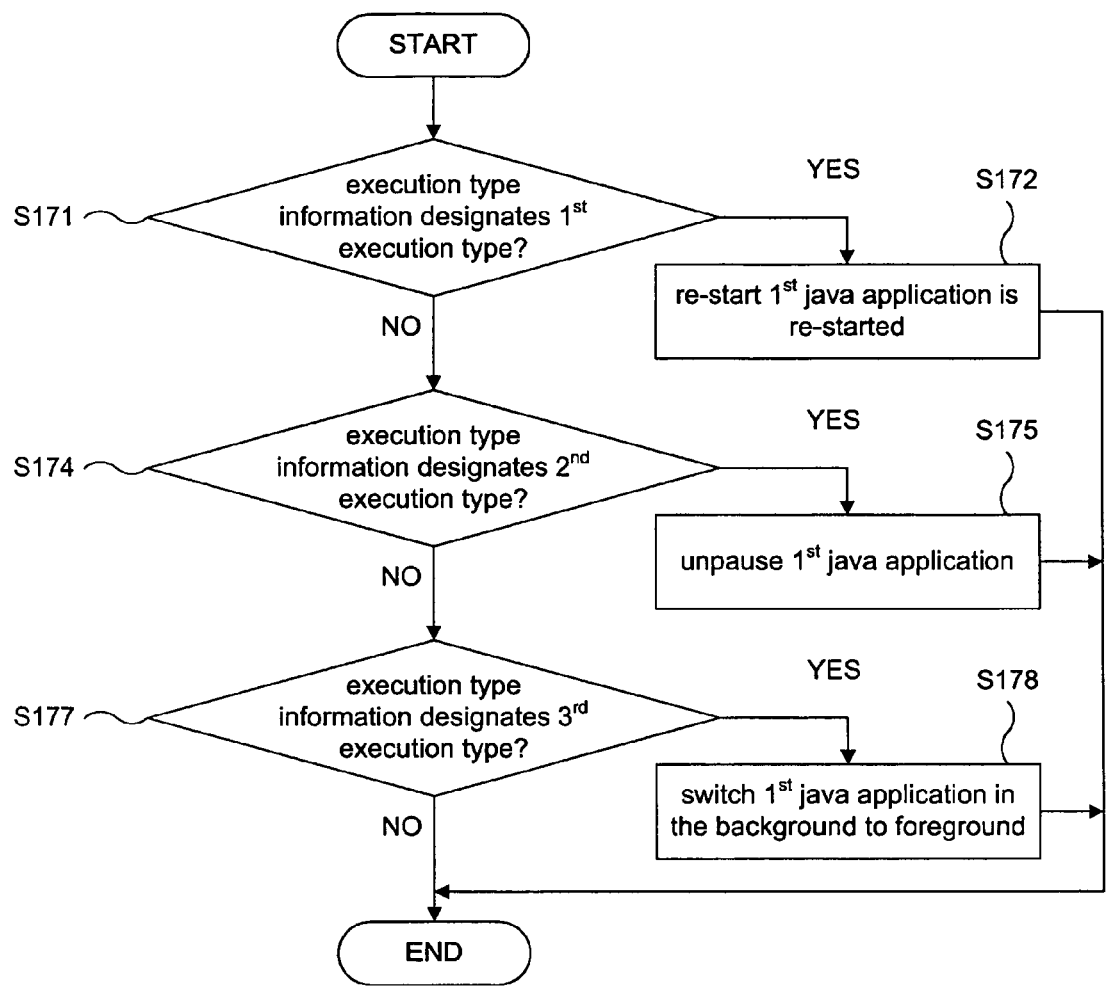
FIG. 5 is a flow diagram illustrating re-changing a state of a first JAVA application based on an execution type information in accordance with the present invention.

FIG. 5 is a flow diagram illustrating re-changing the state of the first JAVA application based on the execution type information.

Referring to FIG. 5, when the execution type designated in the execution type information is the first execution type, the first JAVA application is re-started (S171 and S172).

When the execution type designated in the execution type information is the second execution type, the paused first JAVA application is unpaused (S174 and S175).

When the execution type designated in the execution type information is the third execution type, the first JAVA application in the background is switched back to foreground (S177 and S178).

The first JAVA application and the second JAVA application may relay a shared information to each other, i.e., inter-relay the shared information.

Specifically, if the second JAVA application executed in the step S150 obtains the shared information that is to be shared with the first JAVA application, the second JAVA application may relay the shared information to the first JAVA application in the step S170, and the first JAVA application may use the relayed information.

In one embodiment, when the first JAVA application receives the user input and the received user input includes a certain information which corresponds to the shared information, the first JAVA application transmits the certain information included in the user input to the second JAVA application, and the second JAVA application may use the certain information.

Similarly, when the second JAVA application receives the user input and the received user input includes a certain information which corresponds to the shared information, the second JAVA application transmits the certain information included in the user input to the first JAVA application, and the first JAVA application may use the certain information.

Particularly, the shared information may be inter-relayed when the execution type is the second execution type or the third execution type.

Figure 6:
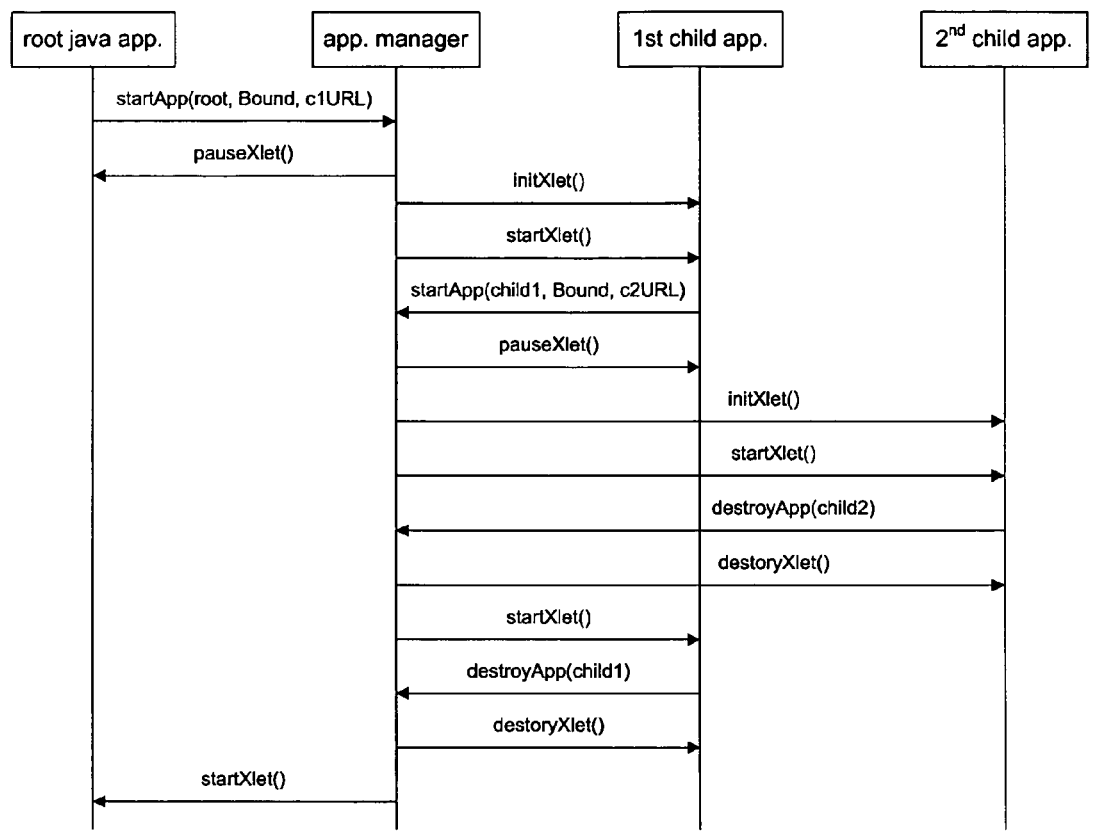
FIG. 6 is a diagram illustrating a configuration wherein a state of a JAVA application is changed based on a second execution type in accordance with the present invention.

FIG. 6 is a diagram illustrating a configuration wherein the state of the JAVA application is changed based on the second execution type.

An application manager shown in FIG. 6 implements the application manager API shown in FIG. 1.

Referring to FIG. 6, the root JAVA application transmits a request for executing the first child JAVA application to the application manager.

Here, the root JAVA application and the first child JAVA application correspond to the first JAVA application and the second JAVA application, respectively.

The request for executing the first child JAVA application is denoted as startApp(root, Bound, c1URL) in FIG. 6.

startApp(root, Bound, c1URL) represents the request for executing, by the root JAVA application (denoted as "root"), the first child JAVA application located at a path "c1URL" according to the second execution type (denoted as "Bound").

When the request startApp(root, Bound, c1URL) is received, the application manager pauses the root JAVA application using pauseXlet( ) function.

The application manager also initializes the first child JAVA application using initXlet( ) function, and starts the first child JAVA application using startXlet( ) function.

Thereafter, the first child JAVA application transmits a request for executing the second child JAVA application to the application manager.

Here, the first child JAVA application and the second child JAVA application correspond to the first JAVA application and the second JAVA application, respectively.

The request for executing the second child JAVA application is denoted as startApp(child1, Bound, c2URL) in FIG. 6.

startApp(child1, Bound, c2URL) represents the request for executing, by the first child JAVA application (denoted as "child1"), the second child JAVA application located at a path "c2URL" according to the second execution type (denoted as "Bound").

When the request startApp(child1, Bound, c2URL) is received, the application manager pauses the root JAVA application using pauseXlet( ) function.

The application manager also initializes the second child JAVA application using initXlet( ) function, and starts the second child JAVA application using startXlet( ) function.

When destroyApp(child2) which is a request for killing the second child JAVA application is received from the second child JAVA application, the application manager kills the second child JAVA application using destroyXlet( ) function.

When the second child JAVA application is killed, the application manager unpauses the paused first child JAVA application. In other words, the application manager starts the first child JAVA application using startXlet( ) function.

When destroyApp(child1) which is a request for killing the first child JAVA application is received from the first child JAVA application, the application manager kills the first child JAVA application using destroyXlet( ) function.

When the first child JAVA application is killed, the application manager unpauses the paused root JAVA application. In other words, the application manager starts the root JAVA application using startXlet( ) function.

Figure 7:
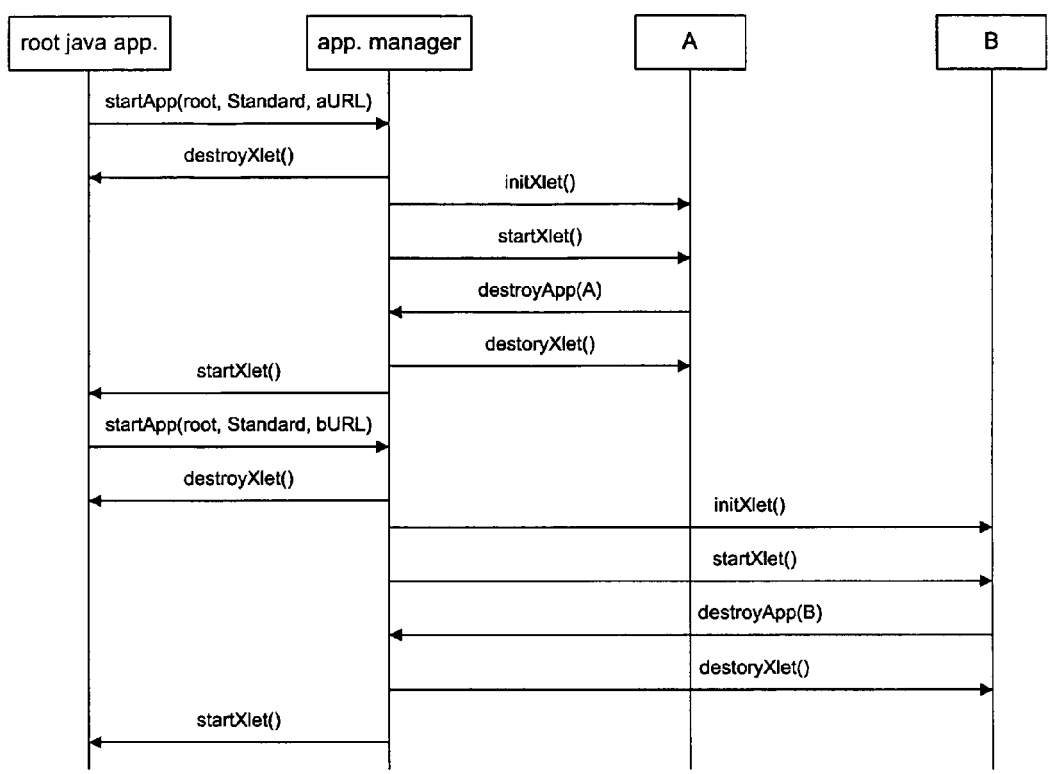
FIG. 7 is a diagram illustrating a configuration wherein a state of a JAVA application is changed based on a first execution type in accordance with the present invention.

FIG. 7 is a diagram illustrating a configuration wherein the state of the JAVA application is changed based on the first execution type.

Referring to FIG. 7, the root JAVA application transmits a request for executing a JAVA application "A" to the application manager.

The request for executing the JAVA application "A" is denoted as startApp(root, Standard, aURL) in FIG. 7.

startApp(root, Standard, aURL) represents the request for executing, by the root JAVA application (denoted as "root"), the JAVA application "A" located at a path "aURL" according to the first execution type (denoted as "Standard").

When the request startApp(root, Standard, aURL) is received, the application manager kills the root JAVA application using destroyXlet( ) function.

The application manager also initializes the JAVA application "A" using initXlet( ) function, and starts the JAVA application "A" using startXlet( ) function.

When destroyApp(A) which is a request for killing the JAVA application "A" is received from the JAVA application "A", the application manager kills the JAVA application "A" using destroyXlet( ) function.

When the JAVA application "A" is killed, the application manager restarts the root JAVA application killed by destroyXlet( ) function. In other words, the application manager starts the root JAVA application using startXlet( ) function.

Thereafter, the root JAVA application transmits a request for executing a JAVA application "B" to the application manager.

The request for executing the JAVA application "B" is denoted as startApp(root, Standard, bURL) in FIG. 7.

startApp(root, Standard, bURL) represents the request for executing, by the root JAVA application (denoted as "root"), the JAVA application "B" located at a path "bURL" according to the first execution type (denoted as "Standard").

When the request startApp(root, Standard, bURL) is received, the application manager kills the root JAVA application using destroyXlet( ) function.

The application manager also initializes the JAVA application "B" using initXlet( ) function, and starts the JAVA application "B" using startXlet( ) function.

When destroyApp(B) which is a request for killing the JAVA application "B" is received from the JAVA application "B", the application manager kills the JAVA application "B" using destroyXlet( ) function.

When the JAVA application "B" is killed, the application manager restarts the root JAVA application killed by destroyXlet( ) function. In other words, the application manager starts the root JAVA application using startXlet( ) function.

A configuration for changing the state of the JAVA application based on the third execution type is similar to that shown in FIG. 6.

When the state of the JAVA application is changed based on the third execution type, background( ) function for switching the JAVA application to the background is used in place of pauseXlet( ) function, and the JAVA application in the background is then switched to foreground.

Figure 8:
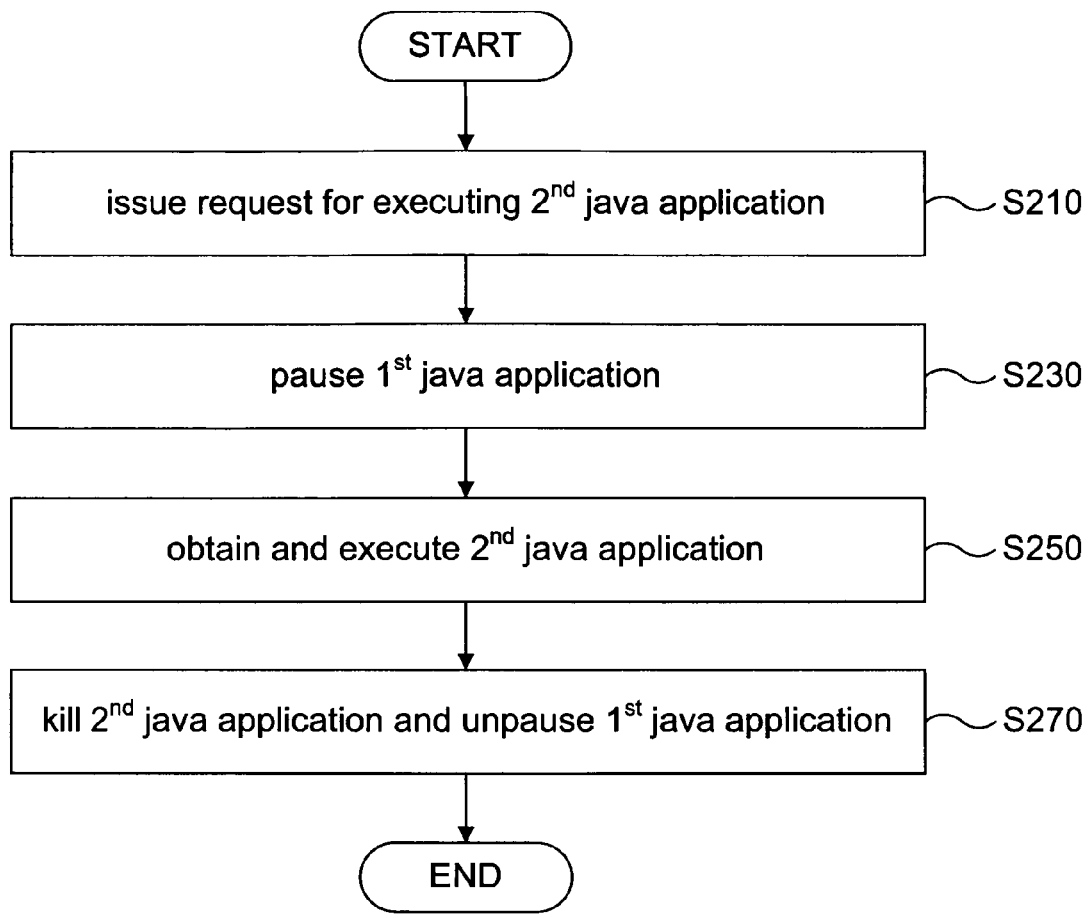
FIG. 8 is a flow diagram illustrating a second embodiment of a method for managing a JAVA application in accordance with the present invention.

FIG. 8 is a flow diagram illustrating a second embodiment of the method for managing the JAVA application in accordance with the present invention.

Referring to FIG. 8, a request for executing the second JAVA application generated by the first JAVA application is issued (S210).

Thereafter, the first JAVA application is paused (S230).

Thereafter, the second JAVA application is obtained and executed in parallel with or after carrying out the step S230 (S250).

When a request for killing the second JAVA application is issued while the second JAVA application is executed, the second JAVA application is killed and the first JAVA application paused in the step S230 is unpaused (S270).

In accordance with the second embodiment, the execution type information is not included in the request for executing the second JAVA application. The second embodiment is identical to the first embodiment except that the execution type information is not included in the request. Therefore, a detailed description is omitted.

Figure 9:
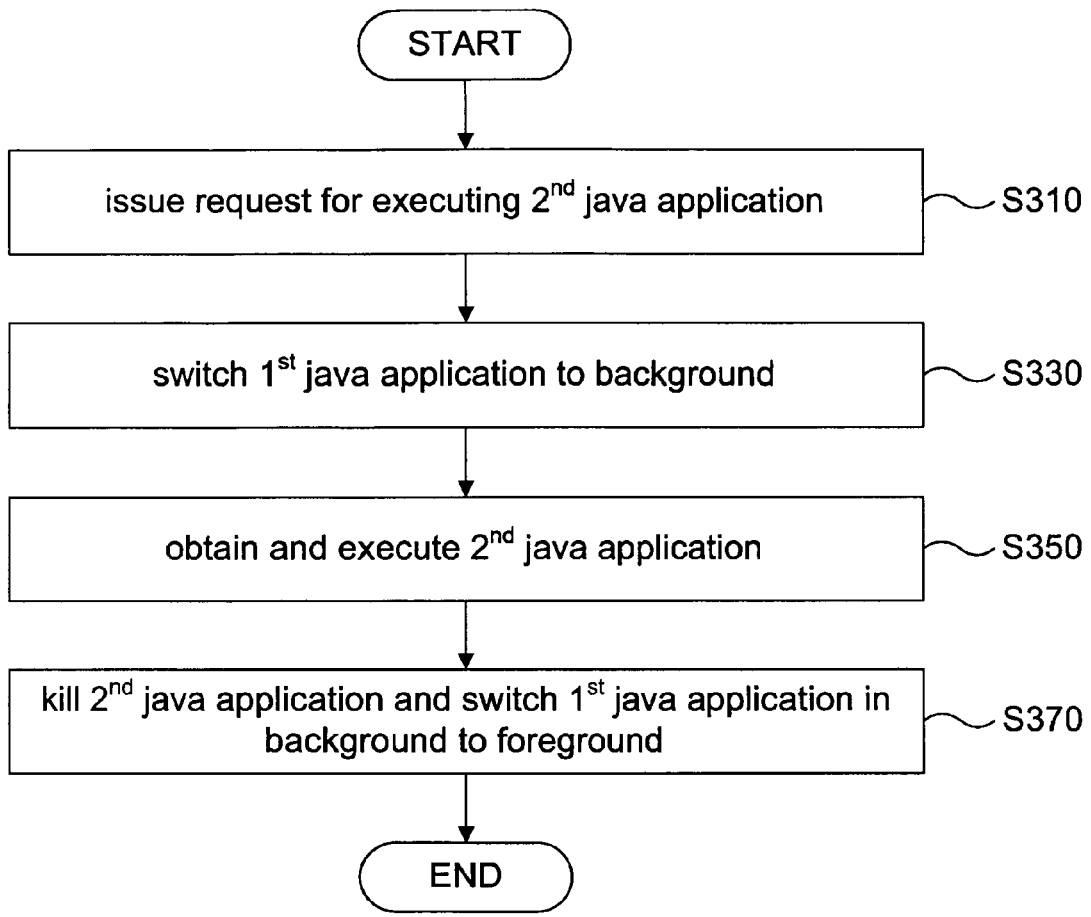
FIG. 9 is a flow diagram illustrating a third embodiment of a method for managing a JAVA application in accordance with the present invention.

FIG. 9 is a flow diagram illustrating a third embodiment of the method for managing the JAVA application in accordance with the present invention.

Referring to FIG. 9, a request for executing the second JAVA application generated by the first JAVA application is issued (S310).

Thereafter, the first JAVA application is switched to background (S330).

Thereafter, the second JAVA application is obtained and executed in parallel with or after carrying out the step S330 (S350).

When a request for killing the second JAVA application is issued while the second JAVA application is executed, the second JAVA application is killed and the first JAVA application in the background is switched to foreground (S370).

In accordance with the third embodiment, the execution type information is not included in the request for executing the second JAVA application. The third embodiment is identical to the second embodiment except that the first JAVA application is switched to background instead of being paused. Therefore, a detailed description is omitted.

In accordance with the present invention, because the first JAVA application may be associated with the second JAVA application, a use of the JAVA application for the user is facilitated, and the JAVA applications developed by different application developers can be associated with each other in order to improve an expandability. For instance, the application developer may create the first JAVA application in a manner that the first JAVA application includes a path for the second JAVA application in order for the user to take advantage of the second JAVA application.

Particularly, the present invention may be applied to base applications of TV portal services, smart phones and Blu-ray players employing the JAVA application.

Various services may be provided based on the execution type information and the path even when the base application does not include every function.

Moreover, the first JAVA application and the second JAVA application inter-relays the shared information in order to guarantee a continuity therebetween.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for managing JAVA applications executable in a user device, the method comprising steps of:
    (a) issuing a request for executing a second JAVA application, the request being issued by a first JAVA application and including a-execution type information, the execution type information containing information on a second application state of the second JAVA application, and a first application state of the first JAVA application while the second JAVA application is in the second application state;
    (b) changing the first JAVA application to the first application state specified in the execution type information while the second JAVA application is in the second application state;
    (c) executing the second JAVA application; and
    (d) killing the second JAVA application when a request for killing the second JAVA application is issued by the second JAVA application and re-changing the state of the first JAVA application changed in the step (b) according to the execution type information.

2. The method in accordance with claim 1, wherein the first JAVA application generates the request for executing the second JAVA application based on a user input received through a user interface.

3. The method in accordance with claim 1, wherein the request for executing the second JAVA application further includes a path for obtaining the second JAVA application.

4. The method in accordance with claim 3, wherein the step (c) comprises executing the second JAVA application by obtaining the second JAVA application at a location defined by the path.

5. The method in accordance with claim 1, wherein the execution type information is selectable between:
    a first execution type wherein the first JAVA application is killed when the second JAVA application is executed and the first JAVA application is restarted when the second JAVA application is killed;
    a second execution type wherein the first JAVA application is paused when the second JAVA application is executed and the first JAVA application is unpaused when the second JAVA application is killed; and
    a third execution type wherein the first JAVA application is switched to background when the second JAVA application is executed and the first JAVA application is switched to foreground when the second JAVA application is killed.

6. The method in accordance with claim 5, wherein the step (b) comprises:
    killing the first JAVA application when the execution type information designates the first execution type;
    pausing the first JAVA application when the execution type information designates the second execution type; and
    switching the first JAVA application to background when the execution type information designates the third execution type.

7. The method in accordance with claim 5, wherein the re-changing the state of the first JAVA application in the step (d) comprises:
    restarting the first JAVA application when the execution type information designates the first execution type;
    unpausing the first JAVA application when the execution type information designates the second execution type; and
    switching the first JAVA application to foreground when the execution type information designates the third execution type.

8. The method in accordance with claim 1, wherein the first JAVA application and the second JAVA application inter-relays shared information.

9. The method in accordance with claim 7, wherein the first JAVA application and the second JAVA application inter-relays shared information when the execution type information designates one of the second execution type and the third execution type.

10. The method in accordance with claim 1, wherein each of the first JAVA application and the second JAVA application includes a JAVA application of Xlet format.

11. A method for managing JAVA applications executable in a user device, the method comprising steps of:
   (a) issuing a request for executing a second JAVA application, the request being issued by a first JAVA application and including a first application state of the first JAVA application while the second JAVA application is being executed;
   (b) pausing the first JAVA application, the first application state being a pause state;
   (c) executing the second JAVA application; and
   (d) killing the second JAVA application when a request for killing the second JAVA application is issued by the second JAVA application and unpausing the first JAVA application paused in the step (b) according to the request.

12. The method in accordance with claim 11, wherein the first JAVA application generates the request for executing the second JAVA application based on a user input received through a user interface.

13. The method in accordance with claim 11, wherein the request for executing the second JAVA application further includes a path for obtaining the second JAVA application.

14. The method in accordance with claim 13, wherein the step (c) comprises executing the second JAVA application by obtaining the second JAVA application at a location defined by the path.

15. The method in accordance with claim 11, wherein the first JAVA application and the second JAVA application inter-relays shared information.

16. The method in accordance with claim 11, wherein each of the first JAVA application and the second JAVA application includes a JAVA application of Xlet format.

17. A method for managing JAVA applications executable in a user device, the method comprising steps of:
   (a) issuing a request for executing a second JAVA application, the request being issued by a first JAVA application and including a first application state of the first JAVA application while the second JAVA application is being executed;
   (b) switching the first JAVA application to background, the first application state being a background execution state;
   (c) executing the second JAVA application; and
   (d) killing the second JAVA application when a request for killing the second JAVA application is issued by the second JAVA application and switching the first JAVA application in background to foreground according to the request.

18. The method in accordance with claim 17, wherein the first JAVA application generates the request for executing the second JAVA application based on a user input received through a user interface.

19. The method in accordance with claim 17, wherein the request for executing the second JAVA application further includes a path for obtaining the second JAVA application.

20. The method in accordance with claim 19, wherein the step (c) comprises executing the second JAVA application by obtaining the second JAVA application at a location defined by the path.

21. The method in accordance with claim 17, wherein the first JAVA application and the second JAVA application inter-relays shared information.

22. The method in accordance with claim 17, wherein each of the first JAVA application and the second JAVA application includes a JAVA application of Xlet format.

* * * * *

UNITED STATES PATENT AND TRADEMARK OFFICE
CERTIFICATE OF CORRECTION

| | |
|---|---|
| PATENT NO. | : 8,347,314 B2 |
| APPLICATION NO. | : 12/656872 |
| DATED | : January 1, 2013 |
| INVENTOR(S) | : Wonjang Baek et al. |

It is certified that error appears in the above-identified patent and that said Letters Patent is hereby corrected as shown below:

Column 9, claim 1, line 65, change "a-execution" to --execution--.

Signed and Sealed this
Nineteenth Day of February, 2013

Teresa Stanek Rea
*Acting Director of the United States Patent and Trademark Office*